Aug. 28, 1945. E. LOPEZ 2,383,661
AUTOMOBILE JACK
Filed Feb. 16, 1944 2 Sheets-Sheet 1

Inventor
ENRIQUE LOPEZ

By Beale & Park
Attorneys

Aug. 28, 1945.  E. LOPEZ  2,383,661
AUTOMOBILE JACK
Filed Feb. 16, 1944  2 Sheets-Sheet 2
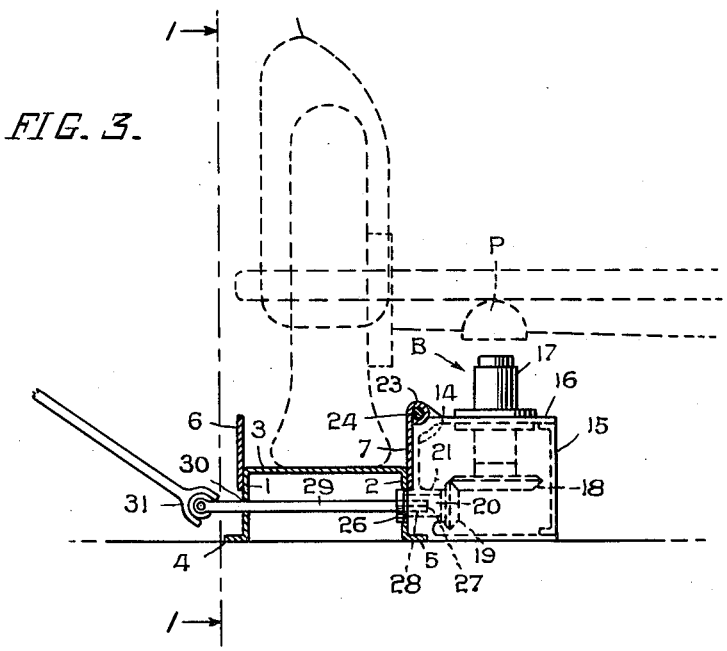
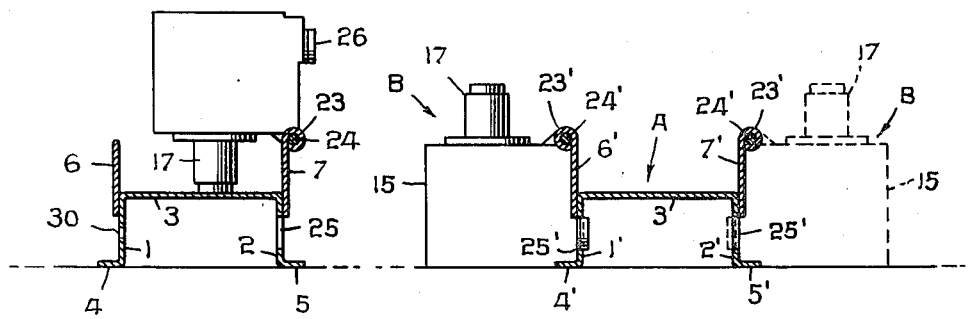
Inventor
ENRIQUE LOPEZ
By Beale & Park
Attorneys Patented Aug. 28, 1945

2,383,661

UNITED STATES PATENT OFFICE 2,383,661

AUTOMOBILE JACK

Enrique López, New York, N. Y.

Application February 16, 1944, Serial No. 522,630

6 Claims. (Cl. 254—88)

My invention consists in a new and useful improvement in automobile jacks and is designed to provide a jack which can be used to raise one of the wheels of an automobile for changing its tire. The novel and useful feature of my improved jack is the means for so relating the jack and the usual jack pad on the automobile that they can co-operate. The usual method, with an ordinary jack, is to place the jack under the jack pad, the automobile being at rest and the jack being inserted thereunder and moved with considerable difficulty until it is correctly positioned. The latest types of automobiles with very low axles and enclosing fenders make this method arduous and annoying. My improved jack makes possible an entirely different method, in which the jack is suitably positioned and the automobile is moved to bring the jack pad properly above the jack. This more desirable method is made possible by the novel structure of my improved jack which comprises a track member for the wheel of the automobile, which is to be lifted, and lifting mechanism associated with the track member. Stop means on the track member secures the correct position of the wheel on the track member, to properly place the jack pad above the lifting mechanism, when the automobile is rolled onto the track member. Another novel and useful feature of my improved jack is the means for connecting the track member and the lifting mechanism, whereby these parts can be connected for use and disconnected or folded for packing in the tool carrier of the automobile.

While I have illustrated in the drawings and have hereinafter fully described certain specific embodiments of my invention, it is to be distinctly understood that I do not consider my invention to be limited to said specific embodiments, but refer for its scope to the claims appended hereto.

In the drawings:

Fig. 3 is a vertical section on the line 3—3 of Fig. 1.

Fig. 4 is a view similar to Fig. 3, showing the parts in folded position.

Fig. 5 is a view similar to Fig. 3, showing a modified form of the device.

Figure 1:
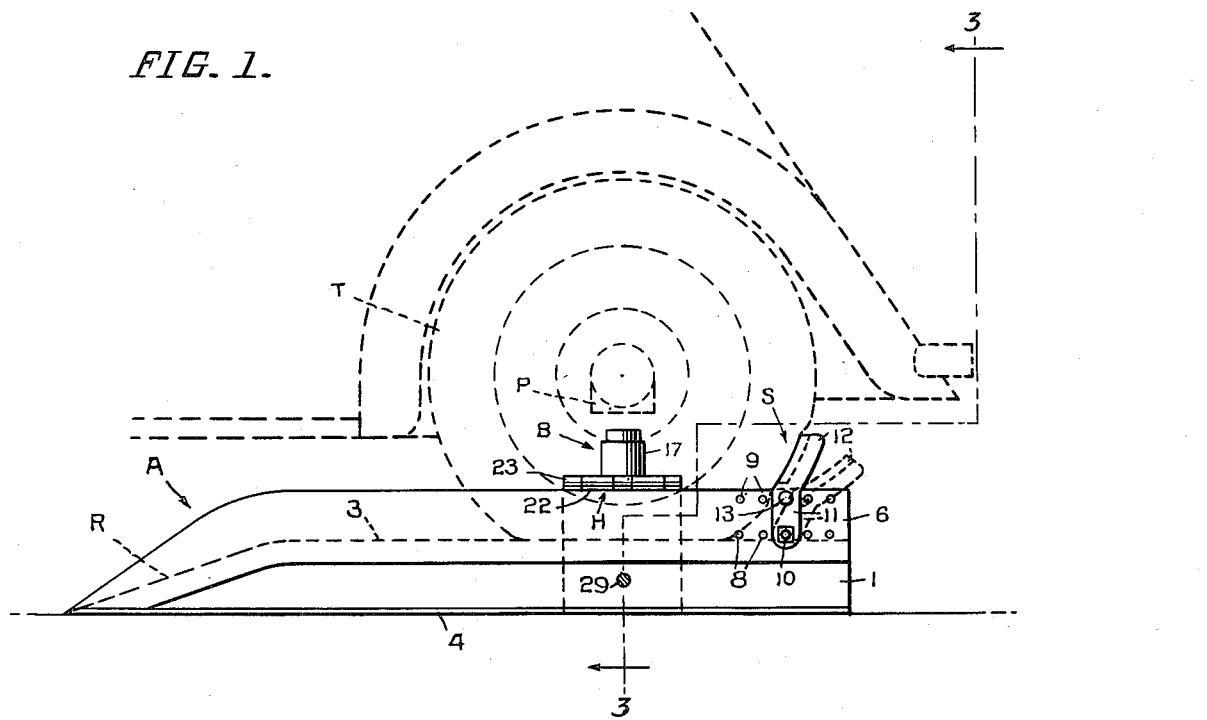
Fig. 1 is a side elevation, on the line 1—1 of Fig. 3, showing the jack in use with the rear left wheel of an automobile shown in broken lines.

As illustrated in the drawings, my improved jack comprises the track member A and the lifting mechanism B hinged thereto. The track member A has the side walls 1, 2 supporting the trackway 3, and provided with base flanges 4, 5 and the side rails 6, 7. The member A has at one end the ramp R rising from the bottom plane of the flanges 4, 5 to the top plane of the trackway 3, and, at the other end, the side rails 6, 7 have a series of registering holes 8, and a series of registering holes 9 aligned vertically with the holes 8. A U-shaped stop S is pivotally mounted on a pintle 10 passed through registering holes 8. This stop S has lugs 11, through which the pintle 10 passes, and which embrace the side rails 6, 7. These lugs 11 depend from a plate 12 bridging the trackway 3 and curved to conform to the arc of the tire T of the automobile. A locking pin 13 is passed through the lugs 11 and rails 6, 7 in holes 9, to hold the stop S in adjusted operating position. The lifting mechanism B comprises a casing having the sides 14, 15 supporting the top 16 in which is mounted a conventional screw jack 17 having the usual miter gear 18 meshing with the miter gear 19 on stub shaft 20 journaled in bearing 21 carried by the side 14. The side 14 is provided at its top with ears 22 which co-act with ears 23 on the top of rail 7, and pintle 24 to form a hinge H connecting the track member A and the lifting mechanism B. The side wall 2 of the track member A is suitably provided with an orifice 25 in which is received the end 26 of the shaft 20 when the lifting mechanism B is in operative position (Fig. 3). The portion of the shaft 20 passing through the side wall 2 has a squared bore 27 in which is received the squared end 28 of an operating rod 29 passed through an orifice 30 in the side wall 1, and having the universal joint 31.

In the modified form illustrated in Fig. 5, the track member A has both side rails 6', 7' provided with ears 23' which co-act with the ears 22 of the lifting mechanism B, so that it can be hingedly connected on either side of the track member A. In this form, it is obvious (Fig. 5) that both side walls 1', 2' have the orifice 25' to receive the shaft 20 therethrough, the operating rod 29 being inserted through the other orifice 25', according to the position of the lifting mechanism B.

Figure 2:
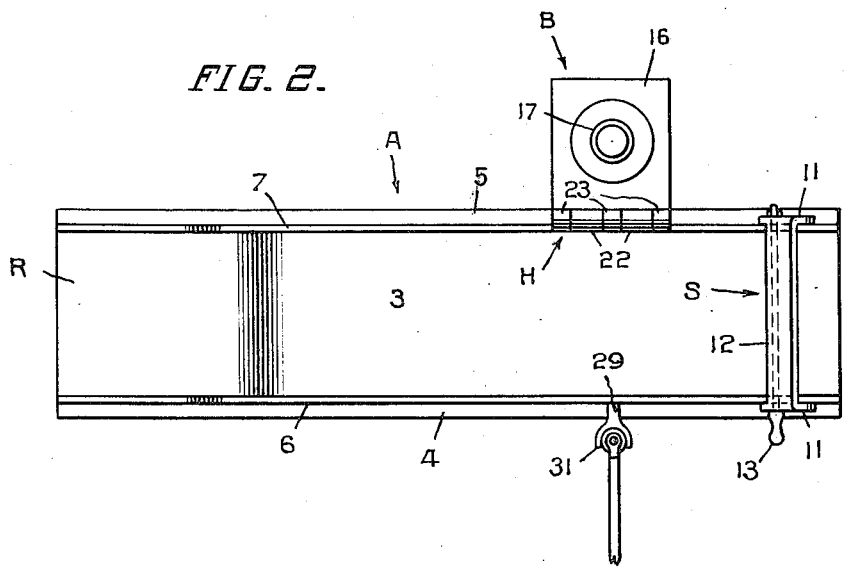
Fig. 2 is a top plan view of the jack.

From the foregoing description of the details of construction of my improved jack, its use and operation will be obvious. When it is desired to raise either the front or rear left wheel of the automobile, the device as illustrated in Figs. 1 and 2 is disposed so that the ramp R is immediately behind the deflated tire T. The automobile is then rolled rearwardly, the wheel passing along the track member A, up the ramp R and on the trackway 3, guided by the rails 6, 7, until the tire T contacts the plate 12 of the stop S, the automobile then stopping, the jack pad P is positioned directly over the screw jack 17 (Figs. 1 and 3). It is obvious that the distance between the stop S and the vertical axis of the screw jack 17 can be exactly determined by the location of the pin 10 in the proper holes 8. Thus my improved jack can be adjusted for use on a particular automobile, the distance between the vertical plane passing through the vertical axis of the jack pad P, and the periphery of the tire T determining the adjustment of the stop S. The operating rod 29 is then inserted through the hole 30 in the side wall 1, its end 28 being inserted into the shaft 20, and the lifting mechanism B is operated in the usual way. When the wheel has been lifted as desired, the locking pin 13 is removed to permit the stop S to be swung away from the tire T, into the position shown in broken lines in Fig. 1, so that the deflated tire can be replaced by an inflated tire. After the change has been completed, the screw jack 17 is lowered away from the jack pad P and the automobile moving forwardly passes from the track member A.

It is obvious that the use of the device with either the front or rear right wheel can be accomplished by placing it ahead of the wheel and the automobile moved forwardly to pass onto the track member A, and moved rearwardly to pass off of it.

When the device is not in use, the operating rod 29 is removed, and the lifting mechanism B is swung on hinge H to the position shown in Fig. 4, for packing in the tool carrier of the automobile, or if desired the pintle 24 can be removed and the parts packed separately.

In the modified form of the device illustrated in Fig. 5, the lifting mechanism B can be operatively positioned on either side of the track member A, as may be desired, so that the right and left wheels can be raised, by moving the automobile forwardly or rearwardly as may be desired.

Having described my invention, what I claim is:

1. In a vehicle jack, the combination of a trackway to receive thereon one wheel of the vehicle and provided on each side with hinge ears; a vertically movable member adapted to lift the wheel from the trackway; a mounting for said movable member provided with hinge ears adapted to be pivoted to the hinge ears on either side of said trackway; and means carried by said mounting to move said member.

2. In a vehicle jack, the combination of a trackway to receive thereon one wheel of the vehicle; a vertically movable member adapted to lift the wheel from the trackway; a mounting for said movable member associated with said trackway; means carried by said mounting to move said member; and stop means, adjustably mounted on said trackway, adapted to relate the wheel on the trackway with the movable member, so that their vertical axes lie in a plane at right angles to the longitudinal axis of the trackway.

3. In a vehicle jack, the combination of a trackway to receive thereon one wheel of the vehicle; a vertically movable member adapted to lift the wheel from the trackway; a mounting for said movable member associated with said trackway; means carried by said mounting to move said member; and means adjustable relatively to said trackway to limit the travel of the wheel along said trackway, in order to position the vehicle in relation to the movable member so that when the member is raised it will lift the wheel from the trackway.

4. In a vehicle jack, the combination of a trackway having a base and side rails; a housing attached to one of said rails; a lifting mechanism in said housing; and means, for operating said mechanism, removably received in said base.

5. In a vehicle jack, the combination of a track member comprising two side walls, a trackway supported on said walls, a ramp leading from the bottom edge of said walls to the top surface of said trackway, two up-standing rails on the sides of the trackway, respectively; and a lifting mechanism comprising a housing attached to one of said rails, a conventional screw-jack mounted in said housing, gearing for operating said screw-jack carried in said housing, and an operating rod journaled in the side walls of the track member and adapted to actuate said gearing.

6. In a vehicle jack, the combination of a track member, for a wheel of the vehicle to roll thereon, having two side rails, each rail having two sets of holes, and the holes of each set in one rail registering with the holes of the corresponding set in the other rail; an arcuate plate, having a depending, perforated lug at each end, pivotally mounted on said rails by a removable pintle passed through the lugs and the rails in the holes of one set in each rail; a removable locking pin passed through the lugs and the rails in the holes of the other set in each rail; and a lifting mechanism mounted adjacent said track member, said plate being thereby adjustable to determine the extent of the rolling of the wheel, to properly adjust it in relation to the lifting mechanism.

ENRIQUE LÓPEZ.